US007021653B2

(12) United States Patent
Burdock et al.

(10) Patent No.: US 7,021,653 B2
(45) Date of Patent: Apr. 4, 2006

(54) AIR BAG MODULE WITH PARTIAL EXTERNAL HOOD OR TETHER

(75) Inventors: John M. Burdock, St. Clair Shores, MI (US); John Cooper, Oxford, MI (US); Jin Ho Jung, Rochester Hills, MI (US); Robert L. Arwood, III, Fraser, MI (US); Robert J. Sadenwater, Clarkston, MI (US); Walter R. Green, Pontiac, MI (US); Mutaz A. Shkoukani, Fraser, MI (US); Jean-Luc Blancou, Troy, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 65 days.

(21) Appl. No.: 10/370,015

(22) Filed: Feb. 20, 2003

(65) Prior Publication Data

US 2003/0189327 A1 Oct. 9, 2003

Related U.S. Application Data

(60) Provisional application No. 60/370,789, filed on Apr. 6, 2002.

(51) Int. Cl.
*B60R 31/22* (2006.01)

(52) U.S. Cl. .................... 280/730.1; 280/743.1; 280/743.2

(58) Field of Classification Search ............. 280/728.1, 280/728.2, 743.1, 743.2, 730.1, 731
See application file for complete search history.

(56) References Cited

U.S. PATENT DOCUMENTS

| | | | | |
|---|---|---|---|---|
| 5,004,266 A | * | 4/1991 | Miller et al. | 280/743.2 |
| 5,348,343 A | * | 9/1994 | Hawthorn | 280/730.1 |
| 5,364,124 A | | 11/1994 | Donegan et al. | 280/730 R |
| 5,380,038 A | * | 1/1995 | Hawthorn et al. | 280/730.1 |
| 5,560,648 A | * | 10/1996 | Rhule et al. | 280/731 |
| 5,727,812 A | * | 3/1998 | Dykstra et al. | 280/731 |
| 5,746,447 A | * | 5/1998 | Dyer et al. | 280/743.2 |
| 5,765,867 A | * | 6/1998 | French | 280/743.2 |
| 5,865,466 A | * | 2/1999 | Yamamoto et al. | 280/743.1 |
| 6,164,696 A | | 12/2000 | Ellerbrok et al. | 280/743.2 |
| 6,209,911 B1 | * | 4/2001 | Igawa et al. | 280/740 |
| 6,334,627 B1 | * | 1/2002 | Heym et al. | 280/743.2 |
| 6,371,510 B1 | * | 4/2002 | Marriott et al. | 280/730.1 |
| 2003/0178832 A1 | * | 9/2003 | Dominissini et al. | 280/743.2 |

* cited by examiner

*Primary Examiner*—Paul N. Dickson
*Assistant Examiner*—Toan C. To
(74) *Attorney, Agent, or Firm*—Markell Seitzman

(57) ABSTRACT

An air bag assembly (20) comprising: an air bag (24) and means for inflating the air bag, and a partial hood or tether (40) for causing the air bag to inflate in an asymmetric manner during inflation, the hood or tethers operatively disengageable from the air bag.

19 Claims, 2 Drawing Sheets

AIR BAG MODULE WITH PARTIAL EXTERNAL HOOD OR TETHER

This is a regularly filed utility patent application claiming priority of provisional patent application 60/370,789, filed Apr. 6, 2002.

The present invention generally relates to air bags and more particularly to apparatus and methods that optimize the interaction of air bags with vehicle occupants who are seated within their respective seat in what is referred to, in the art, as being in an out-of-position (OOP) seating position.

Accordingly the invention comprises: an apparatus that purposely encourages the air bag to inflate, at least initially, in an asymmetric manner. More particularly, the invention comprises an air bag assembly or module including: a folded air bag, means for inflating the air bag, and a partial, external tethering (or covering) mechanism positionable about a portion of the folded air bag to prevent the air bag from inflating symmetrically during the first moments of inflation, the external tether directing the air bag to inflate in a preferred direction.

The preferred embodiment of the present invention incorporates an external tether or hood spanning approximately one-third to about one-half the width of a folded air bag. The tether slows the motion of one-half of the air bag and urges or re-directs the air bag to inflate away from the partial tether toward a preferred initial trajectory. This construction advantageously assists in protecting an occupant that is seated in what would be considered an out-of-position seating orientation. During the initial moments of inflation, the symmetric inflation of the air bag is retarded by use of the partial tether. As the air bag more fully inflates, the partial tether is pushed to the side, permitting the air bag to inflate more symmetrically.

Many other objects and purposes of the invention will be clear from the following detailed description of the drawings.

DETAILED DESCRIPTION OF THE DRAWINGS

Figure 1:
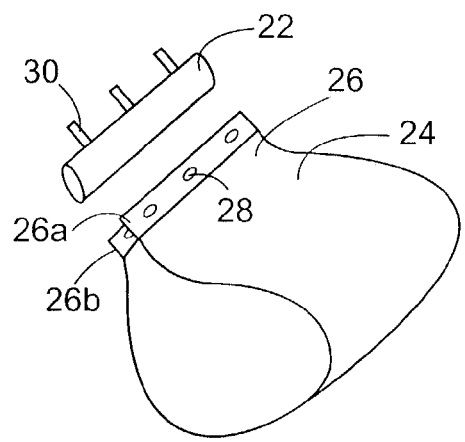
FIG. 1 shows an exploded view of an inflator and an air bag.

Reference is made to FIG. 1, which illustrates the major portions of a prior art air bag module 20, that is an air bag inflator 22 and an air bag 24. In the illustrated embodiment the air bag 24 includes a plurality of opposingly positioned flaps 26a and 26b located in the neck or inlet portion 26 of the air bag. These flaps include mounting openings 28 for receipt of an appropriate fastener as known in the art. As can be appreciated the flaps are not critical to the present invention. The inflator is inserted within the neck 26 of the air bag and the flaps overlapped about mounting studs 30, which extend from the inflator 22. As is also known in the art, the studs can extend directly from a housing or alternatively from a hollow manifold, which is slipped about the inflator. While not shown, the inflator and air bag can be placed within a housing, as is the case with many installations.

Figure 2:
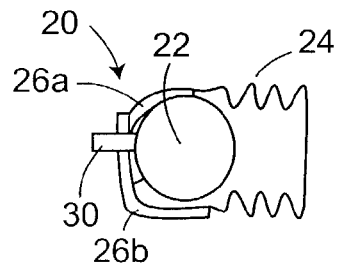
FIG. 2 shows a cross-sectional view of the air bag folded about the inflator.
Figure 3:
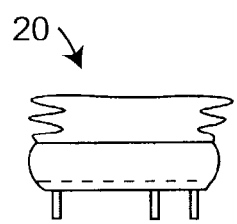
FIG. 3 shows a top plan view of an air bag and inflator of FIG. 2.

FIGS. 2 and 3 diagrammatically illustrate the air bag 24 folded about the (cylindrical) inflator 22. The air bag can, as known in the art, be maintained in this orientation, prior to inflation, by enveloping the folded air bag by a material panel or sock that is easily torn as the air bag inflates such as a perforated panel of Tyvek, paper or other material.

FIG. 3 shows a top view of the air bag module 20 shown in FIG. 2.

Figure 4:
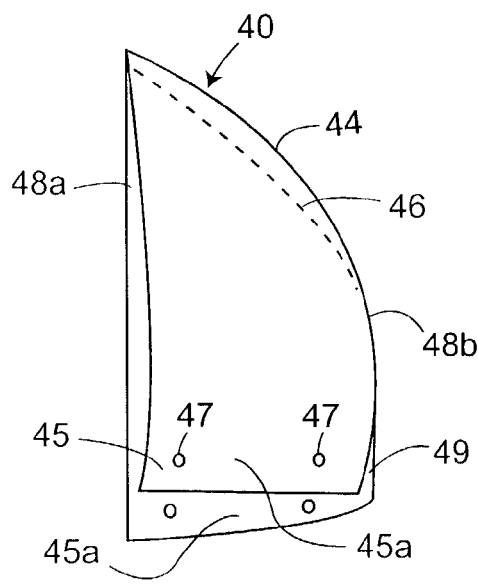
FIG. 4 illustrates an isolated view of an external tether.
Figure 5A:
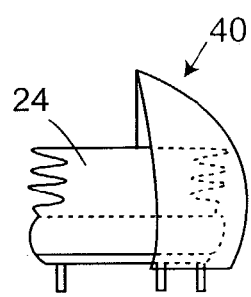
FIG. 5a shows the external tether positioned relative to a folded air bag; the external tether is shown in an active position for the purpose of illustration.

As is known in the art, when inflation gas is uniformly input or delivered into the inlet or neck of the air bag from a source of inflation gas, the air bag will generally tend to inflate in a symmetric manner. However, in the present invention, it is desirable to force the air bag to inflate in a non-symmetric manner primarily to try and protect the out-of-position occupant (OOP occupant). This asymmetric inflation is accomplished by enveloping the folded air bag by an external tether or hood 40 (see FIG. 4), which only partially envelops the folded air bag as shown in FIGS. 5 and 5a.

Figure 5:
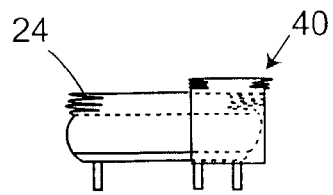
FIG. 5 shows a folded external tether positioned upon a folded air bag.

FIG. 5 shows the tether or hood 40 folded atop the folded air bag. The external tether in FIG. 4 is dome shaped having a top that extends into the path of the inflating air bag and which is angled to encourage the air bag to change its direction of inflation. The tether 40 preferably includes an open side 48a and closed side 48b opposite the open side 48a. In the preferred embodiment the top is angled relative to the direction of inflation of the air bag. In the preferred embodiment the top is arcuately shaped and extends or tapers in a rearward direction toward the other side 48b, which in the preferred embodiment is at least partially closed.

Figure 4A:
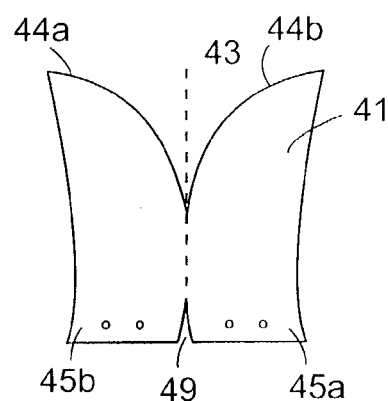
FIG. 4a shows a panel of air bag material used to make the tether.
Figure 4B:
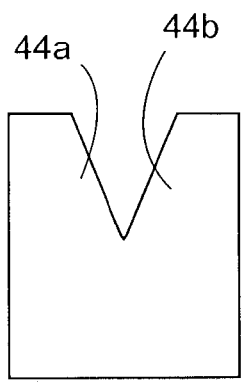
FIG. 4b shows an alternate embodiment of the invention.

In the first embodiment of the invention, the tether 40 is formed by folding a single piece of material such as panel 41, also shown in FIG. 4a, about a centerline 43. The panel 41, which can be formed of the same woven fabric as used for the air bag, is sewn along a seam 46 to join or close opposing top edges 44a and 44b, forming the arcuately shaped top of the tether 40. The central portion of the panel 41 forms the closed side 48b of the tether. The top edges 44a and 44b, in the preferred embodiment, are curved or angled (inclined as shown in FIG. 4b). This curved or angled construction assists the inflating air bag in effectively pushing the tether 40 laterally away from the inflating air bag. The bottom 45 of the tether is formed by the bottom halves of flaps 45a and 45b of the panel (realized after the panel 41 has been sewn together). The bottom halves 45a and 45b may include a plurality of mounting holes 47, positioned to correspond at least with some of the mounting openings 28 and some of the fasteners 30. The bottom halves of the tether are placed on selected fasteners and each bottom half can be placed in overlapping relationship, which effectively encloses the bottom portion of the tether 40.

As can be appreciated the tether can be made using two smaller panels, each of which would resemble one-half of the panel 41 fully separated along the centerline. If two half-panels were used, the seam 46 (see phantom line) would extend from the top 44 along the sides 48b of the two half-panels. Further, in an alternate embodiment of the invention the opposite side 48b of the tether 40 can also be open or partially open as shown for example by slit 49, which can extend along the length of side 48b.

Reference is again briefly made to FIG. 5, which illustrates the tether 40 positioned about the folded air bag 24. The asymmetric positioning of the tether 40 relative to the folded air bag 24 is now more apparent from FIG. 5a. By way of illustration, the air bag 24 of FIG. 5a is shown in a folded state even though the tether 40 is shown in its fully extended position for purpose of illustration. The tether can be folded so that it lies upon the folded air bag as shown in FIG. 5, and the folded tether and air bag can be enveloped by a tearable sack or tearable material, such as a Tyvek, to maintain the air bag and tether in a folded configuration.

Figure 6:
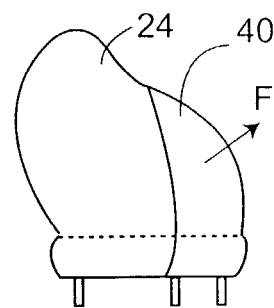
FIGS. 6 and 7 illustrate the operation of the present invention.

Reference is briefly made to FIG. 6, which illustrates the initial moments of air bag inflation. In this state a sufficient amount of inflation gas has entered the air bag 24, causing the volume of the air bag to increase, and thereby causes the air bag to at least tear through or partially tear through the tearable sack or Tyvek layer of material, if used (the Tyvek layer is not shown). Additionally, the Tyvek layer is optional. As the air bag continues to inflate its volume further increases, and as the air bag increases in size it urges the tether to open and unfold from its folded state to the open hood-like shape, as shown in FIG. 5a, partially enveloping or at least able to envelop one side of the inflating air bag, causing the temporary entrapment of the air bag by the tether 40.

The enveloping, inhibiting, holding or cradling of one side of the inflating air bag temporarily inhibits the symmetric inflation of the air bag. For example, as illustrated, the right-hand portion (with reference to the drawings) of the air bag will engage the inner surfaces of the partial tether 40. Until the tether is either torn or moved away, the right-hand portion of the air bag will not inflate. During the next subsequent moments of inflation, the air bag will inflate generally away from restriction imposed by the tether 40. The air bag will tend to inflate generally in a direction opposite the location of the partial tether 40 and expand or continue to expand about the open side 48a. As the air bag inflates the air bag itself will generate a reaction force, F, on the walls of the tether 40, as the unrestricted size of the air bag is greater than the size of the tether 40.

Figure 7:
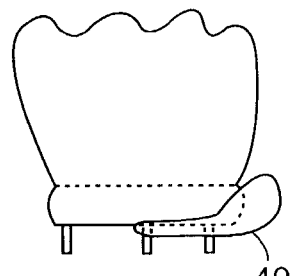

While not mentioned above, the air bag and tether can be made from woven nylon, pliable air bag material, which may or may not be covered by silicone or urethane. As the air bag continues to inflate, the air bag 24, in view of the reaction force F, will urge the tether to slide off of the air bag, encouraged by the interplay of the inflating air bag with the curved or angled configuration of the top of the tether 40, thereby disengaging the tether 40 from the air bag and permitting the air bag to continue to inflate more symmetrically. FIG. 7 illustrates the fully inflated air bag with the tether 40 pushed off to one side of the inflator.

Many changes and modifications in the above-described embodiment of the invention can, of course, be carried out without departing from the scope thereof. Accordingly, that scope is intended to be limited only by the scope of the appended claims.

The invention claimed is:

1. An air bag assembly (20) comprising:
a folded air bag (24) having a first half and a second half, each half positioned opposite an imaginary plane generally bisecting the folded air bag, the folded air bag capable of being inflated, the folded air bag having a top, a bottom, an upper side portion, a lower side portion side and at least one lateral side portion and means for inflating the air bag, and
a partial hood enveloping substantially all of only one of the first or second half of the folded air bag, configured to cause the air bag to inflate in an asymmetric manner during inflation in a direction away from that half of the folded air bag covered by the hood, the hood being operatively disengageable from the folded air bag as the air bag continues to inflate, the hood configured to interact with the inflating air bag to be moved from a position enveloping a portion of the folded air bag toward a disengaged position at the lateral side portion of the inflated air bag.

2. The assembly as defined in claim 1 wherein the hood has an open side into which the folded air bag is received, a closed side initially positioned adjacent at least the lateral side of the folded air bag and a top which is angled relative to a forward direction of inflation of the air bag to encourage disengagement of the hood or tether from the air bag as the air bag inflates.

3. The assembly as defined in claim 2 wherein the hood includes an open side facing a portion of the air bag unrestricted by the hood.

4. The assembly as defined in claim 1 wherein the hood angles or tapers rearward relative to the direction of inflation of the air bag.

5. The assembly as defined in claim 1 including a support member supporting the air bag and the means for inflating the air bag, the support member generally located below the folded air bag and wherein a bottom portion of the hood is located beneath a portion of the support member.

6. An air bag assembly (20) comprising:
a folded air bag (24) capable of being inflated and means for inflating the air bag, a hood or tether (40) configured to interact with only one half of the inflating air bag to thereby inhibit the inflation of this one half of the air bag relative to other portions of the air bag, during initiation of inflation;
wherein as the air bag continues to inflate, the hood is configured to be moved laterally off from the air bag.

7. The assembly as defined in claim 6 wherein the size of the hood or tether is relatively smaller than the size of the inflated air bag.

8. The assembly as defined in claim 7 wherein a side of the hood adjacent a side of the folded air bag is closed.

9. An air bag assembly comprising:
an air bag foldable into a folded configuration, when in the folded configuration the air bag has a first portion and a generally opposing second portion, the first and second portions are contiguous portions of the air bag, both the first portion and the second portion of the air bag inflatable to about the same size;
means for inflating the air bag including inflating the first and second portions of the air bag, and
first means, operatively enveloping only the first portion of the folded air bag while in a folded configuration and interacting with only the first portion of the air bag as the first portion begins to inflate, for retarding the size of the first portion of the inflating air bag relative to the size of the second portion, as the air bag initially expands from its folded configuration; the first means subsequently laterally disengaging from the air bag.

10. The assembly as defined in claim 9 wherein the first means includes a hood or tether (40) configured to interact with the first portion of the inflating air bag to thereby inhibit the inflation of this portion of the air bag.

11. The assembly as defined in claim 10 wherein the hood or tether is configured to be pushed laterally off from the air bag as the air bag continues to inflate.

12. The assembly as defined in claim 11 wherein the size of the hood or tether is relatively smaller than the size of the inflated air bag.

13. The assembly as defined in claim 9 wherein the first means includes a hood or tether having at least a partially closed side adjacent a lateral part of the air bag in its folded configuration, an open side generally opposite the closed side and a top which is angled relative to a forward direction of inflation of the air bag to encourage disengagement of the hood or tether from the air bag as the air bag inflates.

14. The assembly as defined in claim 13 wherein the hood or tether angles or tapers rearward relative to the direction of inflation of the air bag.

15. The assembly as defined in claim 13 wherein a hood includes an open side facing a portion of the air bag unrestricted by the hood.

16. An air bag assembly including:
a folded air bag having a first side portion and a second side portion,
means for inflating the air bag, and
a partial, external catch mechanism placed only about the first side portion of the folded air bag to retard inflation of the first side portion of the air bag relative to inflation of the second side portion of the air bag during the first moments of inflation of the air bag, the external catch directing the air bag to inflate away from the location of the catch; wherein the catch mechanism includes a hood or tether (40) configured to interact with one side of the inflating air bag to thereby inhibit the inflation of this one side of the air bag;
wherein the hood or tether is configured to be pushed laterally off from the air bag as the air bag continues to inflate.

17. The assembly as defined in claim 16 wherein the size of the hood or tether is relatively smaller than the size of the inflated air bag.

18. The assembly as defined in claim 16 wherein the hood or tether has at least a partially closed side adjacent a lateral part of the air bag, an open side and a top which is angled relative to a forward direction of inflation of the air bag to encourage disengagement of the hood or tether from the air bag as the air bag inflates.

19. The assembly as defined in claim 18 wherein the hood or tether angles or tapers rearward relative to the direction of inflation of the air bag.

* * * * *